United States Patent
Knab et al.

(10) Patent No.: US 6,561,603 B2
(45) Date of Patent: May 13, 2003

(54) BASIC RACK

(75) Inventors: Josef Knab, Rossbach (DE);
Alexander Prinz, Postmuenster (DE);
Siegfried Schneiderbauer, Rossbach (DE); Klaus Neuwardt, Simbach (DE)

(73) Assignee: Knuerr-Mechanik fuer die Elektronik Aktiengesellschaft, Munich (DE)

( * ) Notice: Subject to any disclaimer, the term of this patent is extended or adjusted under 35 U.S.C. 154(b) by 0 days.

(21) Appl. No.: 09/840,862

(22) Filed: Apr. 25, 2001

(65) Prior Publication Data

US 2001/0038260 A1 Nov. 8, 2001

(30) Foreign Application Priority Data

May 4, 2000 (DE) .......................................... 100 21 719

(51) Int. Cl.[7] .............................................. A47G 29/00
(52) U.S. Cl. ..................... 312/265.4; 211/183; 403/171
(58) Field of Search .......................... 312/265.1, 257.1, 312/265.4, 111, 140; 211/183, 182; 403/171, 172, 404

(56) References Cited

U.S. PATENT DOCUMENTS 3,736,035 A * 5/1973 Brown et al. ............... 312/107
5,695,263 A 12/1997 Simon et al.
5,820,289 A 10/1998 Kern et al.
6,332,657 B1 * 12/2001 Fischer ........................ 312/111

FOREIGN PATENT DOCUMENTS

| DE | 93 02 769.2 | 5/1993 | ............ H05K/5/00 |
| DE | 691 01 727 T2 | 9/1994 | ............ H05K/7/18 |
| DE | 195 29 270 C1 | 10/1996 | ............ H05K/7/18 |

* cited by examiner

*Primary Examiner*—Lanna Mai
*Assistant Examiner*—Jerry Anderson
(74) *Attorney, Agent, or Firm*—Jacobson Holman PLLC

(57) ABSTRACT

In a basic rack, particularly for equipment cabinets, transverse profiles and depth profiles are connected by corner connectors to an upper and lower frame. Vertical profiles connect the upper and lower frame in the area of the corner connectors. At least the transverse and depth profiles are made from a triangular, particularly rectangular hollow profile. The corner connectors are provided with two complimentary constructed triangular fixing extensions for mounting the transverse and depth profiles. The vertical profiles have terminal end fastening inserts for fastening to the corner parts of the corner connectors.

17 Claims, 3 Drawing Sheets

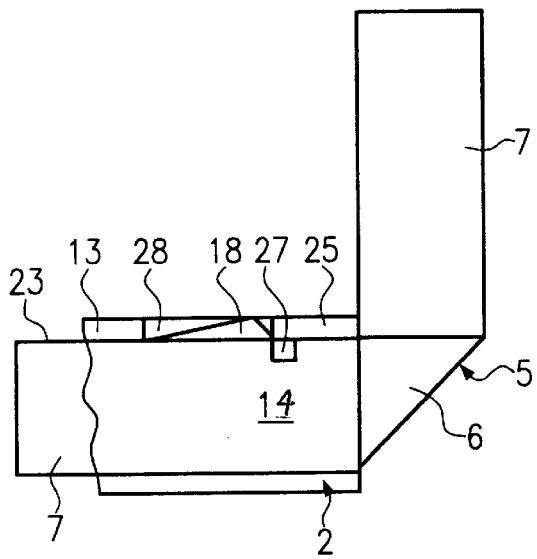
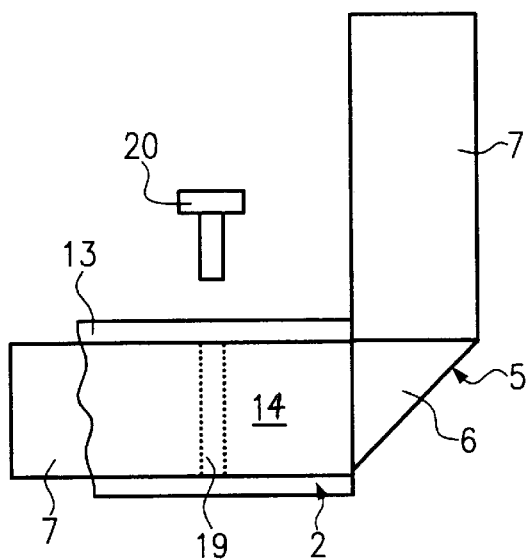
FIG.4  FIG.5
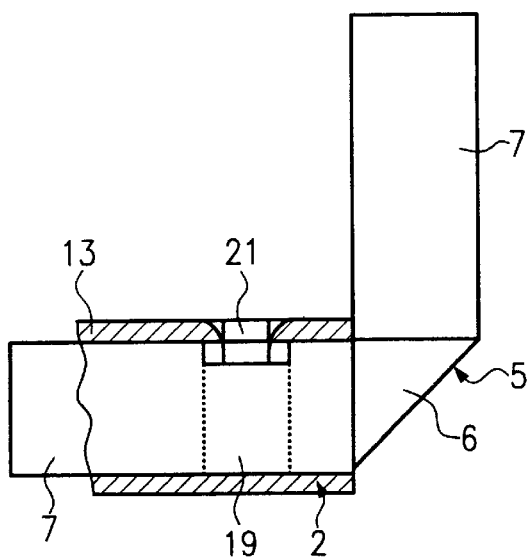
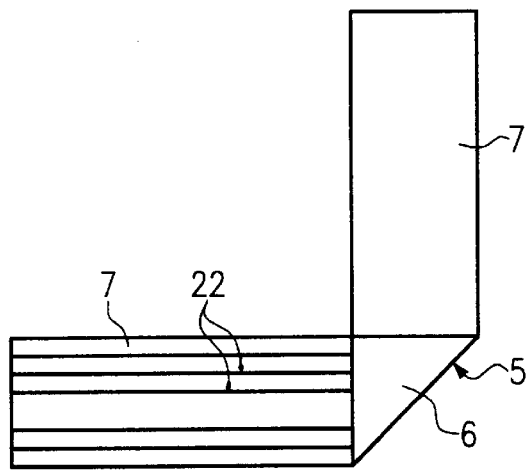
FIG.6  FIG.7

BASIC RACK

BACKGROUND OF THE INVENTION

1. Field of the Invention

The present invention relates to a basic rack, particularly for equipment cabinets. The rack includes transverse profiles and a depth profiles, which are connected by means of corner connectors to an upper and a lower frame. Vertical profiles connect the upper and lower frame in the area of the corner connectors.

The invention is fundamentally suitable for cabinets, casings and containers, but preferably for cabinets, which are used for receiving electrical and electronic equipment and components, e.g. for LAN, computer and server cabinets. The invention can also be used for worktables and in particular workshop benches, in which three beams or profiles are connected at right angles to one another at a corner.

2. Description of the Related Art

DE 93 02 769 U1 discloses an equipment cabinet, which has guide members for mounting purposes and through holes for fastening the vertical, horizontal or depth beam with the aid of fastening elements. The guide members are constructed on front connecting faces of the corner connector and cooperate with a complimentary front opening of the beams. The fastening of the mounted beams subsequently takes place with three fastening elements guided in through holes of the corner connector and which are in each case inserted and secured in correspondingly constructed fastening openings of the beams.

A basic rack for equipment cabinets described in DE 195 29 270 C1 also has corner connectors with three extensions. The extensions have the same square or circular cross-section as the mountable profiles. For permanent electrical connection as well as for mechanical fastening of a mounted hollow profile, which cannot be released without destruction, each member has at least one depression into which is pressed material of the hollow profile, e.g. a punched out tongue.

In one corner connector construction two extensions are shaped and the third extension can be detachably fixed, e.g. screwed down.

DE 691 01 727 T2 discloses a basic rack with transverse, depth and vertical profiles, which are connected with the aid of corner connectors having three fixing extensions. The profiles and fixing extensions, which have a triangular cross-section, are detachably connected by clamping and subsequent screwing. For clamping the profiles mounted on the fixing extensions the latter are provided with a slit, which can be correspondingly widened by a screw.

The known basic racks with a rectangular or square cross-section of the profiles are relatively costly from the material standpoint and also have a correspondingly high weight. The detachable fastening of the triangular profiles mountable on the corner connector extensions leads to high construction, manufacture and fitting costs. A stamping or crimping of the mounted profiles requires an additional tool, which can have a disadvantageous effect in the case of in situ mounting.

SUMMARY OF THE INVENTION

The object of the invention is to create a stable basic rack, which permits a simple construction as well as a relatively low weight, an inexpensive manufacture and extremely efficient installation.

According to the invention the object is achieved by a basic rack having transverse profiles and depth profiles, which are connected by means of corner connectors to an upper and lower frame. Vertical profiles extend between the upper and lower frame. At least the transverse profiles and depth profiles of the upper and lower frame are formed by a triangular hollow profile. Each corner connector has a corner part with two extensions for mounting a triangular transverse profile and a depth profile. The vertical profiles are terminally provided with fastening inserts for fastening to the corner parts of the corner connectors.

A fundamental idea of the invention is to move away from square and rectangular hollow profiles for mounting on corner connector extensions and instead to use triangular profiles. Through a suitable arrangement of two lateral faces of the triangular profile, which preferably form a right angle, the necessary fastening possibilities for built-in rails, etc. and for the securing of the covering parts of an equipment cabinet are ensured.

A further fundamental idea of the invention is the use of corner connectors with two shaped fixing extensions for forming a lower and upper frame and the connection of the vertical profiles by means of fastening inserts. The fastening inserts are located in end regions of the vertical profiles.

According to the invention at least the transverse profiles and depth profiles of an upper and lower frame are constructed from a triangular hollow profile, e.g. by cutting to length. The transverse and depth profiles are mounted and fixed with a limited clearance on complimentary shaped extensions of a corner connector, which are shaped on a corner part. The vertical profiles are connected by means of terminally positioned fastening inserts with the corner connectors in the region of the corner parts.

It is advantageous that the vertical profiles can be fastened with their fastening inserts in detachable manner to the upper and lower frame. In the case of conversion or reequipping the upper and lower frame, the vertical profiles can be reused.

It is appropriate for inexpensive manufacture and installation for the vertical profiles to comprise the same triangular hollow profiles as the transverse and depth profiles. This has an advantageous effect on what has to be kept in stock.

As fastening inserts it is possible for threaded blocks to be terminally received and fastened in the vertical profiles, e.g. pressed, stamped or screwed. The fastening inserts in each case have a threaded channel for a fastening screw, which is guided by the corner parts and screwed in the fastening inserts of the vertical profiles.

The corner parts and fixing extensions are appropriately constructed in such a way that the transverse and depth profiles to be connected are fastened with positive and frictional engagement and engage with a clamping area on the end part. The vertical profiles with the terminal fastening inserts in each case engage with their faces. This leads to a corner connection with securely fastened profiles ensuring a high stability of the rack.

It can be appropriate to fasten the transverse and depth profiles in a secure manner to the corner connectors. This can take place through known stamping or crimping.

The transverse and depth profiles are particularly advantageously fastened to the fixing extensions if the latter have engagement elements and the transverse and depth profiles have complimentary openings for receiving the engagement elements in the fastening position. For installation without tools, the engagement elements can be constructed as wedge-like noses, which prevent an unintentional detachment of the profiles.

A further fastening possibility can be provided through the fixing extensions having at least one hole, which can run horizontally or vertically and the mounted transverse and depth profiles are fastened with the aid of an impact pin which can be driven into the hole. In this case there is no need to form openings or recesses in the mounted transverse and depth profiles. The impact pins can be inserted manually or with a corresponding device.

A threaded passage-like fastening possibility provides for a through hole in the transverse and depth profiles and a larger diameter hole in the fixing extensions. The projecting material of the transverse and depth profiles can then be pressed into the through holes, so that once again a reliable fastening is obtained.

A detachable or fixed fastening of the transverse and depth profiles can also be brought about with the aid of an adhesive. It can then be appropriate to form grooves, e.g. longitudinal grooves or also transverse grooves, on the fixing extensions for receiving the adhesive.

BRIEF DESCRIPTION OF THE DRAWINGS

The invention is described in greater detail hereinafter relative to the attached diagrammatic drawings, which show:

FIG. 4 A plan view of a corner connector with mounted and fastened transverse profile.

FIG. 5 A plan view of a corner connector with mounted transverse profile and a further fastening variant.

FIG. 6 A plan view of a corner connector with mounted transverse profile and a further fastening variant.

FIG. 7 A plan view of a corner connector for an adhesive fastening of the transverse and depth profiles.

DESCRIPTION OF THE PREFERRED EMBODIMENTS

Figure 1:
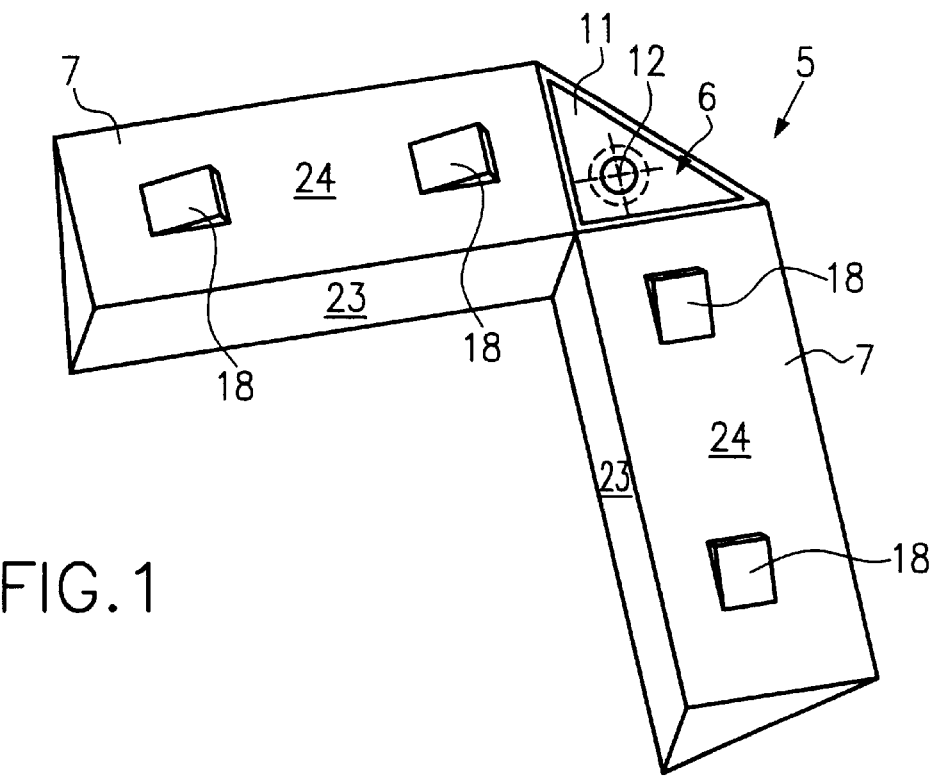
FIG. 1. A perspective view of a corner connector for the basic rack according to the invention.

FIG. 1 shows a corner connector 5 comprising a corner part 6 and two fixing extensions 7 at right angles to one another and located in one plane. In the present embodiment the corner connector 5 is used for forming a left-hand, rear rack corner according to FIG. 2, in which a transverse profile 2, a depth profile 3 and a vertical profile 4 are arranged as x, y and z-coordinates.

The two fixing extensions 7 of the corner connector 5 have a triangular cross-section with engagement elements 18 for the secure fastening of the mountable transverse profile 2 and depth profile 3. The transverse profile 2 and depth profile 3 are cut to length from a triangular hollow profile, which is constructed of a complimentary shape to the fixing extensions 7 and can be mounted or engaged with a limited clearance on the fixing extensions 7.

A secure and fixed fastening of the mounted transverse and depth profiles 2, 3 is achieved by recesses 28, or alternately openings, which are constructed of a complimentary shape to the engagement elements 18 of the fixing extensions 7 in the transverse and depth profiles 2, 3. To facilitate understanding, engagement elements 18 are only shown positioned in FIG. 1 located on horizontally oriented lateral faces 24 of the fixing extensions 7, but in FIG. 2 they are omitted as are the recesses 28 shown in FIG. 3. In FIG. 3, the rear view of a corner connector 5 with a vertical profile 4 fastened thereto, a partly mounted transverse profile 2, a recess 28 in the transverse profile 2 and the complimentary engagement elements 18 on the fixing extensions 7 are shown.

FIG. 4 shows that the engagement elements 18, which are constructed as wedge-like noses, can also be provided on the vertical lateral faces 23 of the fixing extensions 7. The wedge-like construction of the engagement elements 18 permits a sliding mounting and locking of the profiles 2, 3, whilst forming a clamping area 25 with positive and frictional engagement. It is appropriate to provide a space 27 for receiving the chips produced during mounting.

The corner connectors 5 have a corner part 6 constructed of a complimentary shape to the triangular fixing extensions 7. A contact surface 11, which is positioned horizontally in the case of an assembled upper and lower frame (not shown), is constructed as a right-angled triangle and is used for the frontal engagement of a vertical profile 4 (cf. FIG. 1).

In the same way as the transverse profiles 2 and depth profiles 3, the vertical profile 4 is appropriately produced from the same triangular hollow profile and is screwed and therefore detachably fastened to the corner parts 6 of the lower and upper frame. For this purpose a vertical profile 4 can in each case be provided with a (not shown) thread in which can be screwed a (not shown) central fastening screw guided in a hole 12 of the corner part 6.

Figure 2:
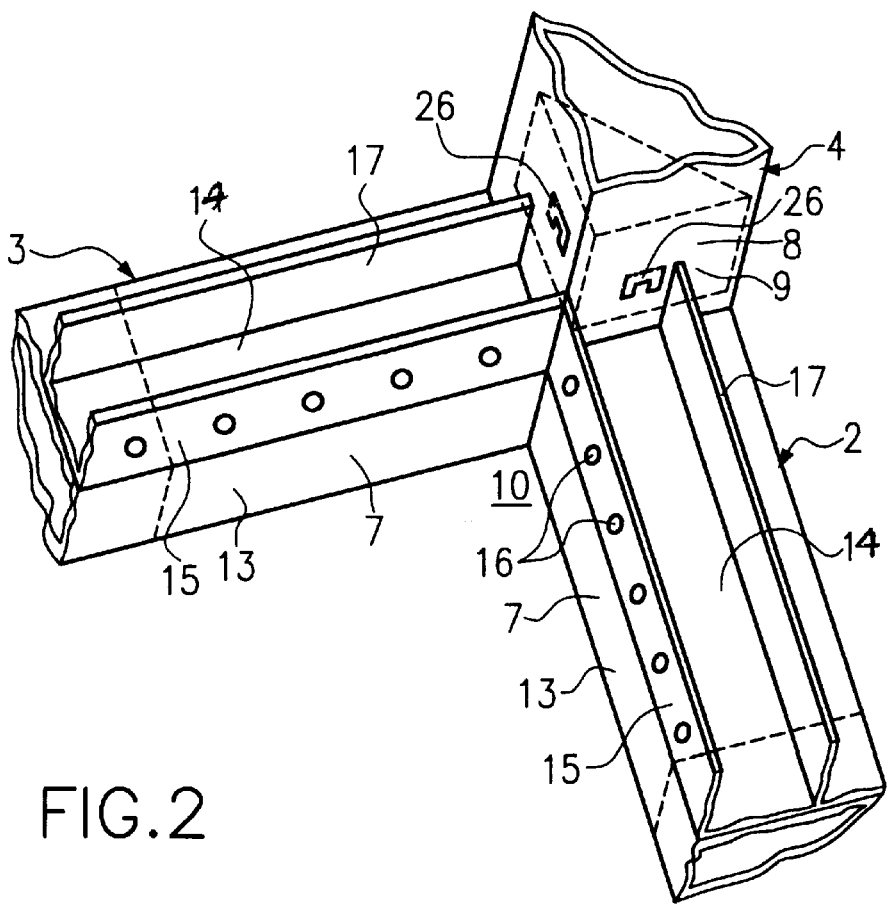
FIG. 2 A perspective view of a corner region of a basic rack according to the invention.
Figure 3:
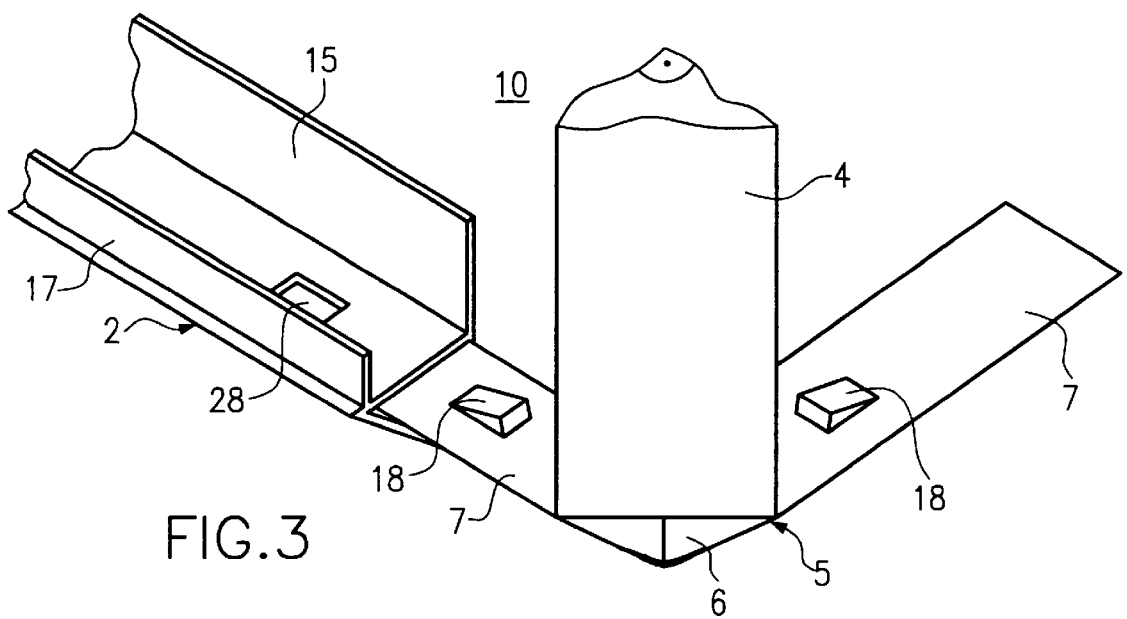
FIG. 3 A perspective rear view of a corner connector with a partly mounted transverse profile and fastened vertical profile.

FIG. 2 shows a preferred, detachable fastening of the vertical profiles 4 on the corner parts 6 of the corner connector 5 of the lower and upper frame. The vertical profiles 4 are provided at their ends with fastening inserts 8, e.g. threaded blocks 9 and the (not shown) threads are formed in these fastening inserts 8. The fastening of the thread block 9 shown in FIG. 2 takes place by means of stampings 26. The threaded blocks 9 can also be pressed or screwed down. The only (not shown) fastening screw is then guided from the outside through the corner part 6 and is secured in the threaded block 9, so that an engagement and reliable fastening of the vertical profile 4 with the threaded block 9 on the contact surface 11 of the corner part 6 is ensured.

FIG. 2 shows a constructional variant of the transverse, depth and vertical profiles 2, 3, 4, in which the transverse profiles 2 and depth profiles 3 are provided on an inner surface with a fastening web 15 and with a retaining web 17 parallel thereto on an outer surface. FIG. 2 shows that the fastening web 15 and retaining web 17 can be constructed as part of a U-shaped profile. The fastening web 15, which is aligned with a vertically oriented lateral face 13 of the transverse profile 2 or vertical profile 4, is provided with fastening openings 16, which can in particular be constructed in a grid-like manner. The parallel retaining web 17 is provided for securing the lining or covering parts of an equipment cabinet, e.g. the side walls, a rear wall, a front door and/or a top and bottom plate (not shown) and is spaced from the outer edge.

The perspective rear side view of the corner connector 5 according to FIG. 3 with two fixing extension 7 and a partly mounted transverse profile 2 corresponds to FIGS. 1 and 2. Both the transverse profiles 2 and depth profiles 3, as well as the vertical profiles 4 and fixing extensions 7 are cross-sectionally constructed as a right-angled triangle, whose lateral faces 12, 13 or 23, 24 forming the right angle are directed towards an inner area 10 (cf. also FIG. 2).

FIGS. 4 to 7 show alternative fastening possibilities for the triangular hollow profiles mountable on two fixing extensions 7 of a corner connector 5 and in each case only one transverse profile 2 with an end region is shown.

The fastening according to FIG. 4 corresponds to the already described fastenings according to FIGS. 1 and 3 and the same features carry the same reference numerals. In the fastening shown in FIG. 5 at least one horizontally oriented hole 19 is made in the fixing extensions 7. The mounted transverse profile 2 or depth profile 3 is securely fasted with the aid of an impact pin 20 which can be driven into said hole 19.

In the alternative fastening according to FIG. 6 at least one horizontal hole 19 is made in a fixing extension 7 and a through hole 21 is aligned therewith in the mounted profile 2. The through hole 21 has a smaller diameter than the hole 19. Fastening takes place by pressing the projecting materials of the mounted profile 2 into the hole 19, so that there is a threaded passage comparable to a stamping.

FIG. 7 shows a corner connector 5 with two fixing extensions 7 and one extension 7 is provided in an exemplified manner with grooves 22. The grooves can be in the form of longitudinal grooves and/or transverse grooves. In the same way the second fixing extension 7 can have longitudinal or transverse grooves, which serve to receive an adhesive for adhering the mounted transverse profiles 2 or depth profiles 3.

All the fastening variants of the mounted transverse profiles and depth profiles 3 shown ensure positive engagement and frictional engagement by a clamping area immediately adjacent to the corner part 6 of th corner connector 5, so that there is a reliable fastening of the transverse profiles 2 and depth profiles 3 and together with the screwable vertical profile 4, a stable basic rack can be created.

What is claimed is:

1. Basic rack for equipment cabinets, comprising:
   transverse profiles, depth profiles and vertical profiles, the transverse profiles and depth profiles being connected by corner connectors to provide an upper and a lower frame, the vertical profiles being connected to the upper and lower frame at the corner connectors,
   at least the transverse profiles and depth profiles of the upper and lower frame being formed from a triangular hollow profile and having a fastening web,
   each corner connector having a corner part and two fixing extensions for mounting a transverse profile and a depth profile, and
   the vertical profiles being provided at each end with a fastening insert for fastening each vertical profile to the corner parts of the corner connectors,
   the fastening web being positioned on an inner surface and in a vertically oriented manner on the triangular hollow profile of the transverse profiles and depth profiles.

2. Basic rack according to claim 1, wherein the vertical profiles are formed from a same triangular hollow profile as the transverse profiles and depth profiles of the upper and lower frame.

3. Basic rack according to claim 2, wherein the fastening inserts are threaded blocks fixed with a fastening screw guided through the corner part.

4. Basic rack according to claim 3, wherein the threaded blocks are fastened in the vertical profiles by one of pressing, stamping and screwing and have a thread channel for the fastening screw.

5. Basic rack according to claim 2, wherein the corner parts of the corner connectors have a triangular contact surface for a frontal contact of the vertical profile with the fastening insert.

6. Basic rack according to claim 5, wherein the corner parts of the corner connectors are complimentary shaped to the triangular fixing extensions and have a hole for receiving and guiding a fastening screw.

7. Basic rack according to claim 6, wherein the transverse profiles, depth profiles and vertical profiles are a right-angled triangle and arranged in such a way that lateral faces enclosing the right angle are directed towards an inner area formed by the rack.

8. Basic rack according to claim 1, wherein the corner connectors are aluminum castings and the transverse profiles, depth profiles and vertical profiles are triangular hollow profiles manufactured from one of extruded aluminum sections and rolled sections.

9. Basic rack according to claim 7, wherein the fastening web is provided with a perforated grid as fastening openings.

10. Basic rack according to claim 7, wherein the triangular hollow profile of the transverse profiles and depth profiles is provided with a retaining web.

11. Basic rack according to claim 10, wherein the retaining web is positioned on an outer surface and vertically extends parallel to the fastening web.

12. Basic rack according to claim 10, wherein the transverse profiles and depth profiles mounted on the fixing extensions are fastened to the corner connectors.

13. Basic rack according to claim 12, wherein the transverse profiles and depth profiles are fixed by one of stamping and crimping on the fixing extensions of the corner connectors.

14. Basic rack according to claim 12, wherein the fixing extensions have engagement elements and the transverse profiles and depth profiles have recesses for receiving the engagement elements in a fastening position.

15. Basic rack according to claim 12, wherein the fixing extensions are provided with at least one hole and the mounted transverse profiles and depth profiles are fixed with the aid of an impact pin which is driven into the hole.

16. Basic rack according to claim 12, wherein the fixing extensions are provided with a hole and the transverse profiles and depth profiles with a through hole aligned in a mounted fastening position and the through hole has a smaller diameter than the hole and projecting material is pressed in in an area of the through hole.

17. Basic rack according to claim 12, wherein the transverse profiles and depth profiles are fixed by adhesion to the fixing extension and grooves for receiving the adhesive are formed on the fixing extensions.

* * * * *